United States Patent
Cole

(10) Patent No.: US 7,423,693 B2
(45) Date of Patent: Sep. 9, 2008

(54) VIDEO DELAY STABILIZATION SYSTEM AND METHOD

(76) Inventor: James R. Cole, 1000 Circle Blvd., Corvallis, OR (US) 97330-4239

( * ) Notice: Subject to any disclaimer, the term of this patent is extended or adjusted under 35 U.S.C. 154(b) by 599 days.

(21) Appl. No.: 11/191,550

(22) Filed: Jul. 28, 2005

(65) Prior Publication Data

US 2007/0024746 A1   Feb. 1, 2007

(51) Int. Cl.
H04N 9/475 (2006.01)
H04N 3/27 (2006.01)
H04N 5/268 (2006.01)

(52) U.S. Cl. ............... 348/518; 348/515; 348/554; 348/706

(58) Field of Classification Search ......... 348/518, 348/519, 500, 554, 555, 515, 512, 705, 706; H04N 5/04, H04N 9/475, 3/27, 5/46, 5/268

See application file for complete search history.

(56) References Cited

U.S. PATENT DOCUMENTS

| | | | |
|---|---|---|---|
| 4,313,135 A | 1/1982 | Cooper | |
| 4,703,355 A * | 10/1987 | Cooper | 348/512 |
| 5,202,761 A * | 4/1993 | Cooper | 348/515 |
| 6,452,974 B1 | 9/2002 | Menon et al. | |
| 6,842,727 B1 | 1/2005 | Hayashi | |
| 6,850,284 B2 | 2/2005 | Gries et al. | |
| 6,891,573 B2 | 5/2005 | Schreiber et al. | |
| 2003/0142232 A1 | 7/2003 | Albean | |
| 2004/0205214 A1 | 10/2004 | Bang et al. | |
| 2005/0019020 A1 | 1/2005 | Sato | |

FOREIGN PATENT DOCUMENTS

| | | |
|---|---|---|
| EP | 1 067 773 A2 | 1/2001 |
| EP | 1 104 179 A2 | 5/2001 |
| GB | 2 225 686 A | 6/1990 |
| GB | 2 273 215 A | 6/1994 |
| WO | WO 99/44363 | 9/1999 |

* cited by examiner

Primary Examiner—Sherrie Hsia

(57) ABSTRACT

A video delay stabilization system configured for multiple types of video input signals, includes a plurality of video processing modules, and a variable delay module. The plurality of video processing modules include at least one module that is selectively actuable depending upon the type of input signal, each module adding an incremental time delay to a video output signal. The variable delay module is configured to insert into the video output signal a programmed time delay equal to a difference between a maximum possible time delay added by the plurality of video processing modules, and an actual total time delay added by the modules.

18 Claims, 3 Drawing Sheets

| | 3D Y/C SEP. | 3D NOISE RED. | DEINTER-LACING |
|---|---|---|---|
| CVBS | X | X | X |
| S-VIDEO | | X | X |
| YPbPr - 480i | | X | X |
| YPbPr - 480p | | X | |
| HDMI - 480i | | | X |
| HDMI - 480p | | | |

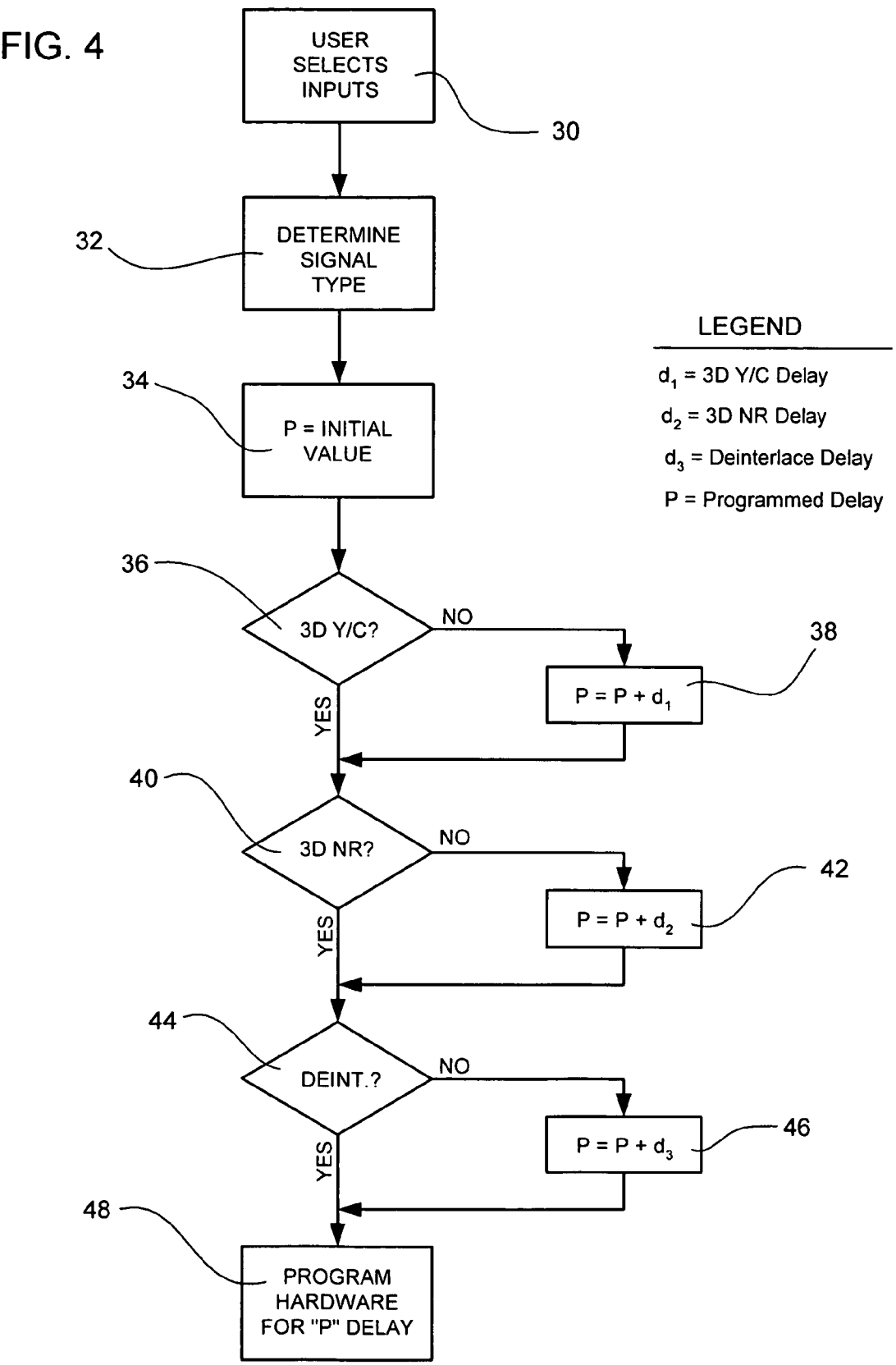

VIDEO DELAY STABILIZATION SYSTEM AND METHOD

BACKGROUND

In audio-visual display systems, the synchronization of audio output with video images ("AV sync") is an important element for a satisfactory display. The human sensitivity to AV sync is highly variable, but generally needs to be less than ±80 msec for "good" performance. That is, if the audio is not synchronized with the video images to within ±80 msec, the results will be unsatisfactory to viewers. It is generally believed that a high-quality system should strive for video to lead the audio by <40 msec. In extreme cases, the requirements can be as stringent as 5 msec, such as for animation or live action designed to highlight music.

Synchronization of audio and video signals in consumer AV systems is a relatively new problem because of the increasing popularity of AV systems that use separate audio and video output components. New video display devices, such as digital projectors, have increasingly complex video processing pipelines that result in large amounts of delay. In addition, the amount of delay can vary significantly, depending on the type of processing to be done. For example, interlaced composite analog video requires much different processing than progressive-scan digital HDTV. However, users may often make use of different types of input to the display, so that the resulting video delay will vary. Unfortunately, if the user has compensated for the video delay in an external audio system (as is becoming increasingly common), this compensation may not be correct for all video input types. Additionally, there is no way for the audio delay to be automatically adjusted to match the changing video delay. Consequently, a user can become frustrated because their system does not perform consistently well. Additionally, given the stringent requirements for AV sync mentioned above, it is probably not possible to select a single amount of audio delay that can "center" the delay to make performance acceptable for all video input types.

Audio delay capabilities are frequently added to a home-theater setup as a stand-alone box, or as a feature integrated into an audio amplifier. In such a case, however, providing a proper video signal delay to match the externally-created audio delay is required. Additionally, some television sets with integrated sound systems may have audio delay built-in to compensate for the video delay. Nevertheless, whether an AV system comprises separate audio and video components, or is an integral system, a better system for maintaining AV sync is desirable.

BRIEF DESCRIPTION OF THE DRAWINGS

Various features and advantages of the invention will be apparent from the detailed description which follows, taken in conjunction with the accompanying drawings, which together illustrate, by way of example, features of the invention, and wherein:

FIG. 4 is a flow chart showing the steps in calculating the variable delay.

DETAILED DESCRIPTION

Figure 1:
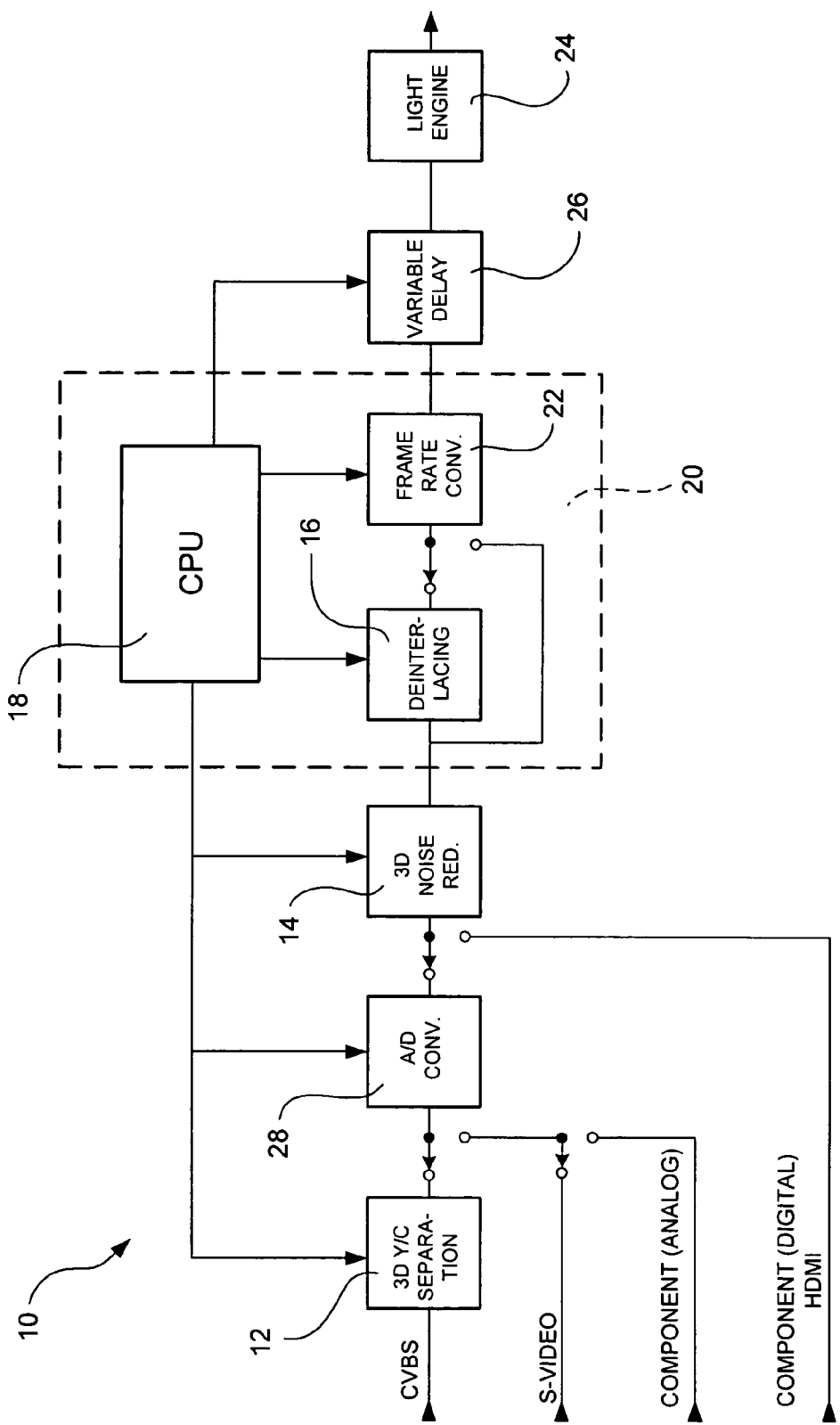
FIG. 1 is a block diagram of a video processing system configured to insert a variable delay.

Reference will now be made to exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the invention which would occur to one skilled in the relevant art and having possession of this disclosure are to be considered within the scope of the invention.

This disclosure relates to a system and method for inserting a variable delay into the image-processing pipeline of a video display, to stabilize the overall delay that video signals encounter. As noted above, it is typical in AV systems for the audio and video to become out of sync when they are processed separately. Typically, the video is delayed because of advanced processing algorithms required for processing.

Figures 2, 3:
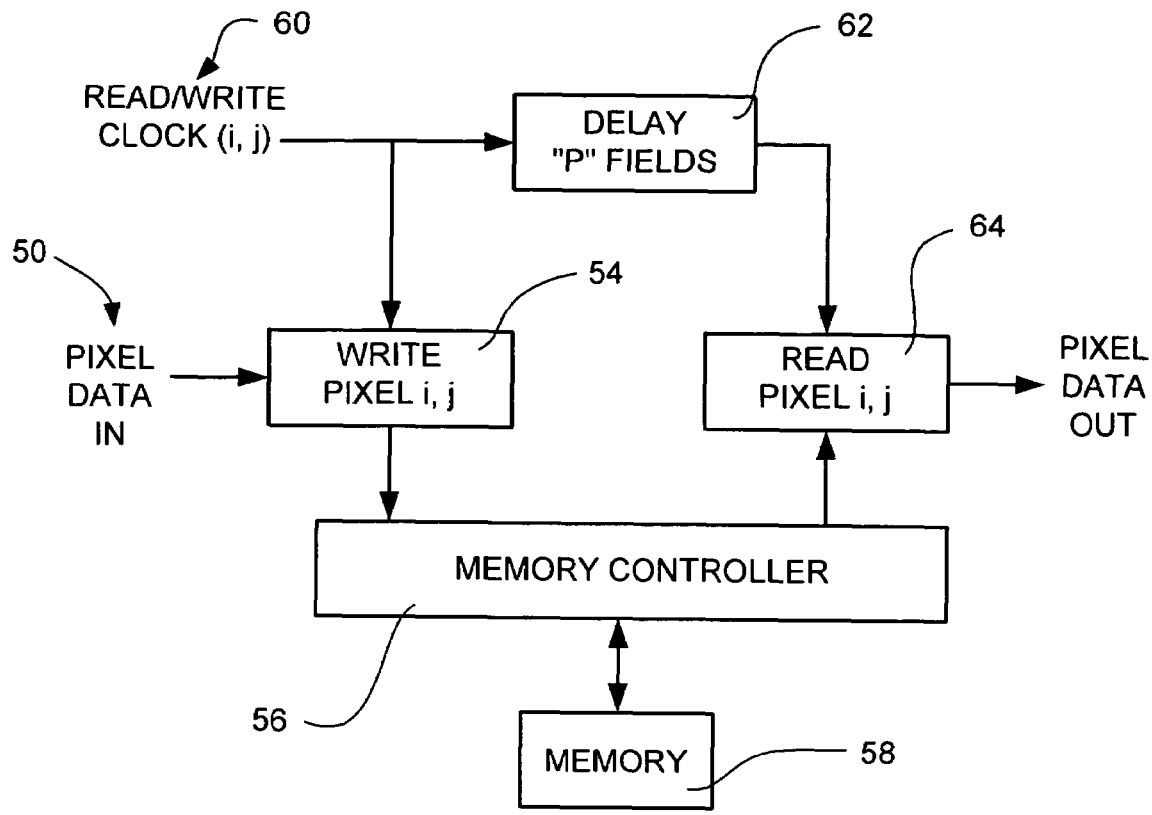
FIG. 2 is a block diagram showing the steps performed by the variable delay module.
FIG. 3 is a table of processing requirements for various video input types.

The table in FIG. 3 shows how different video input types can incur different delays. For example, composite video ("CVBS") requires Y/C separation, heavy noise filtering, and deinterlacing. On the other hand, S-video and analog component video ("YPbPr 480i") do not need Y/C separation, but do need noise filtering and deinterlacing. Analog progressive scan ("YPbPr 480p") does not need Y/C separation, does need noise reduction, but doesn't need deinterlacing. Digital component video ("HDMI 480i") input does not require Y/C separation or 3D noise reduction, but does require deinterlacing. Finally, digital progressive scan ("HDMI 480p") input does not need Y/C separation, noise reduction, or deinterlacing. Other variations not described here can be due to different input resolutions, such as HDTV and computer graphics, or the need for artifact reduction for sources which have been compressed. Each of these also present specific video processing requirements.

Each of these video processing steps introduce a different amount of incremental delay into the video processing pipeline. The block diagram of FIG. 1 illustrates a video processing system 10 configured to process each of the above-mentioned types of video input, and helps show how these different delays enter the video stream. A video image comprises a series of frames presented very rapidly. In the U.S., (under NTSC standards), each frame period lasts 33.4 msec. In Europe (under PAL standards) each frame period lasts 40 msec. Each frame is comprised of two interlaced fields, each field including half the video information (e.g. each field comprising every other row of pixels in the image). Thus, each field interval is half the frame period. Under NTSC standards, therefore, one field represents a 16.7 msec time interval.

During the video processing sequence, shown in FIG. 1, various processing steps introduce a delay that is some multiple of the field interval. Since some processing steps are required for some signals and not for others, not all modules or blocks are activated for all video types, so that the total delay can vary. For example, composite video ("CVBS") input is first routed through a 3D Y/C separation module or block 12. This module adds one field of delay. The 3D noise reduction module 14 typically adds 1-3 fields, depending upon the noise reduction algorithm that is used, and the type of the input signal. While 1-3 fields is a typical value, very advanced and complex noise reduction algorithms can add much more than this amount of delay. The deinterlacing module 16 adds 3-6 fields, again, depending on the algorithm used and the type of signal.

Other modules also add delay, though some delay types apply to all signal types, and thus do not introduce variation in the delay. Each video processing module is connected to the CPU 18, which controls their operation. The deinterlacing step is part of a scaler 20, which also includes a frame-rate conversion module 22. This module adds another 2 fields, as does the light engine 24, which finally converts the video signal into an image. The light engine can include the spatial light modulator, an illumination source, illumination optics, projection optics, resolution enhancement optics, etc. Frame-rate conversion and processing by the light engine introduce non-variable or fixed delays—delays that are experienced by all video input types, and therefore do not cause variation in total delay. Similarly, the analog-to-digital (A/D) conversion module 28, typically does not add delay, and the embodiment of the invention shown in FIG. 1 is such a system. However, if the A/D conversion module did add delay to the video processing pipeline, the incremental delay of this step would also be taken into account in the manner described below.

When all of the incremental delays are added up, it becomes apparent that the total delay in the example illustrated in the figures can vary from as little as 67 msec (under NTSC standards) for digital progressive scan, to as much as 234 msec for composite video. This gives a maximum delay variation of 167 msec. In the case of European systems, where the time value of one field is 20 msec, the total delay can range from 80 milliseconds to 280 milliseconds, giving a delay variation of 200 milliseconds for the same system configuration. This level of delay is well within the human sensitivity to AV sync, and not even close to the level considered necessary for high-quality synchronization.

To correct for this possible variation in delay, a variable delay module 26 is inserted into the video processing sequence. This module inserts a programmable amount of delay so that the total delay is substantially constant, regardless of the video input type. The amount of delay is set by the display's processing system (the CPU 18), which is able to calculate the total system delay depending on the video processing that is to be done.

One method of calculating the variable delay amount is depicted in the flow chart of FIG. 4. The user of the video display system can first select the input source (step 30) for the video display device. This can be done, for example, by using a keypad on a projector, or by using an on-screen menu to select the video input source. Alternatively, the video display system can be configured to automatically detect the signal type, and thus the only user input is the mere connection of a particular data cable to an input port of the video projector. Regardless of the input method, the CPU "knows" the input source.

With this information, the CPU can detect and determine the type of signal (step 32), and thus determine the signal processing steps and consequent delay that will be experienced. The system initializes the variable or programmed delay value P to some initial value (step 34), then proceeds through several steps to add variable delay amounts to this value. The initial value of P can be zero, or it can be some other value to compensate for certain fixed delays. For example, if certain steps in the video processing system add fixed amounts of delay regardless of the type of video signal, the initial value of P can be the sum of these values. Additionally, the initial value of P can subtract some value. For example, if an audio system adds a fixed amount of incremental delay (e.g. through complex signal processing), the initial value of P may need to be reduced by that amount to allow AV synchronization. In other words, if the Audio system naturally delays the audio signal by some fixed amount, the amount of variable delay that must be inserted into the video signal will be less than otherwise.

If 3D Y/C separation (considered at step 36) is not required by the signal type, the value of P is increased by the amount of 3D Y/C separation delay that would have been experienced (step 38). Next, if 3D noise reduction (considered at step 40) is not required, the value of P is increased by the amount of delay 3D noise separation would have added (step 42). Finally, if deinterlacing (considered at step 44) is not required, the value of P is increased by the amount of delay that deinterlacing would have added (step 46). Each of these incremental delay values are additive. At the end of the process, the system hardware is programmed (step 48) by the CPU to insert a programmed delay that is equal to the final value of P.

It must be borne in mind that the system and process depicted in FIG. 4 is exemplary. Other types of variable delay steps can also be included in the video processing sequence. If so, these other delays will be considered and, where appropriate, added to the variable delay value of P in the same manner as those discussed above.

The programmed delay value is the total delay that must be added to the signal to cause the video signal to always experience the maximum delay. In other words, the variable delay module inserts into the video signal an incremental time delay equal to the difference between a maximum possible time delay added by the video processing, and an actual total time delay added by the system, including the activated modules. The CPU knows the value of the maximum delay, and calculates the difference from the max delay and the current delay (which may be zero), and programs that amount into the variable delay. The result is that the overall delay is constant, at the maximum value. This stabilizes the total video delay.

Provided in FIG. 2 is a block diagram showing the steps performed by the variable delay module. The variable delay module receives pixel data (designated at 50), and writes this data (step 54) into a memory controller 56. The memory controller reads and writes data directly into and out of memory 58 as needed. The variable delay module is interconnected to a clock (e.g. associated with the CPU), which provides a read/write time reference (designated at 60), typically one clock pulse per pixel. Based upon the programming received from the CPU, which dictates the value of P, the delay step 62 in the variable delay module will restrict the timing at which the pixel data is read out of the memory controller (step 64). That is, pixel data is read out at the same rate it is received, but it is held for the value of P before being read out. The delay P can be expressed in terms of fields (as in FIG. 2), or in terms of frames, or in other units or increments. It will be apparent that the programmed delay value P can be zero, in which case no delay is inserted. This can be the case for composite video, which is the most common type. However, for most types of video input, some delay will usually be added.

To provide good consistent AV sync, the corresponding audio signal must also be delayed. This is typically done with a standard audio delay circuit, in a well-known manner. In some applications, where the audio stream is handled by a media processor, the delay can be implemented as a software loop. From the user's standpoint, the delay is typically implemented through an external amplifier, with the user programming a fixed delay amount based on, for example, information in a user's manual. With the video delay stabilization steps discussed above, the proper audio delay to insert is usually the maximum total delay for the video processing. This delay amount will be the inserted variable delay P, which can include the sum of all other non-variable or constant delays. Thus the audio is set to compensate for the maximum video delay, which will always occur, with the result that the AV stream will always be in sync with the video stream.

While the block diagram of FIG. 1 shows the variable delay module 26 being inserted immediately prior to the light engine 24, the delay can actually be inserted almost anywhere in the image pipeline. In practice, the variable delay is likely to be inserted fairly late in the process, since the input is often highly multiplexed. Nevertheless, there is no single proper place to insert the delay.

Additionally, the system can be configured to automatically dynamically adjust for different input types without input from a user. The CPU is designed to configure the signal processing pipeline to properly display the video data. Consequently, the CPU is constantly aware of the input signal type, as noted above. This is typical with current display systems, and the way it is done is well known to those skilled in the art. Accordingly, if the input signal type changes, the CPU will automatically detect the change in order to provide a proper output picture, and can automatically adjust the variable delay parameters at the same time. Thus a user can configure a home theater with components of their choice, adjust the AV synchronization to be "perfect", and know it will stay perfect no matter how the input varies.

The system thus allows high quality AV sync to be maintained with a wide variety of video signal types. Signal types that can be accommodated with the present system include analog composite video, S-video, analog interlaced component video, analog progressive-scan component video, digital interlaced component video, digital progressive scan, compressed video, serial digital video (SDI), and others. Where processing of each type of video signal causes a different delay, the system inserts a variable delay so that the total delay is substantially constant, and can be more easily synchronized with an audio output signal.

It is to be understood that the above-referenced arrangements are illustrative of the application of the principles of the present invention. It will be apparent to those of ordinary skill in the art that numerous modifications can be made without departing from the principles and concepts of the invention as set forth in the claims.

What is claimed is:

1. A video delay stabilization system, comprising:
a video processing system, configured to receive and process multiple types of video input signals, and including
a plurality of video processing modules, including at least one module that is selectively actuable depending upon the type of video input signal, each module adding an incremental time delay to a video output signal; and
a variable delay module, configured to delay the video output signal by a programmed time delay equal to a difference between a maximum possible time delay added by the plurality of video processing modules, and an actual total time delay added by the video processing modules.

2. A video delay stabilization system in accordance with claim 1, wherein the multiple types of video input signals are selected from the group consisting of composite video, S-video, analog component video, analog progressive scan, digital component video, and digital progressive scan.

3. A video delay stabilization system in accordance with claim 1, wherein the plurality of video processing modules are selected from the group consisting of a Y/C separation module, a noise filtering module, a deinterlacing module, a frame-rate conversion module, and a light engine configured to convert the output signal into a video image.

4. A video delay stabilization system in accordance with claim 3, further comprising a CPU, configured to detect the input signal type, and to calculate the programmed time delay based upon the actual total time delay added by required video processing modules for the input signal type.

5. A video delay stabilization system in accordance with claim 3, wherein the Y/C separation module adds a time delay equal to about 1 field, the noise filtering module adds a time delay equal to about 2 to 3 fields, the deinterlacing module adds a delay equal to about 3 to 6 fields, the frame-rate conversion module adds a delay equal to about 2 fields, and the light engine adds a delay equal to about 2 fields.

6. A video delay stabilization system in accordance with claim 1, wherein the programmed time delay can vary within a range of from about 0 milliseconds to about 200 milliseconds.

7. A video delay stabilization system in accordance with claim 1, wherein the variable delay module is configured to write pixel data to a memory controller, and to delay output of the pixel data to a light engine by a time value equal to the programmed time delay.

8. A video delay stabilization system configured for multiple types of video input signals, comprising:
a plurality of video processing modules, including at least one module that is selectively actuable depending upon the type of input signal, each module adding an incremental time delay to a video output signal; and
a variable delay module, configured to insert into the video output signal a programmed time delay equal to a difference between a maximum possible time delay added by the plurality of video processing modules, and an actual total time delay added by the modules.

9. A video processing system in accordance with claim 8, wherein the plurality of video processing modules include a Y/C separation module, a noise filtering module, a deinterlacing module, and a frame-rate conversion module.

10. A video processing system in accordance with claim 8, wherein the variable delay module is configured to write pixel data to a memory controller, and to delay output of the pixel data to a light engine by a time value equal to the programmed time delay.

11. A method for stabilizing video delay in an audio-visual system, comprising the steps of:
detecting a type of a video input signal;
determining an actual time delay caused by a sequence of video processing steps for the type of the input signal; and
inserting into the sequence of video processing steps a programmed time delay equal to a difference between a maximum possible time delay for the sequence of video processing steps, and the actual time delay.

12. A method in accordance with claim 11, further comprising the step of setting an audio time delay equal to the total maximum time delay for an audio signal associated with the video signal, so as to synchronize the audio signal with the video signal.

13. A method in accordance with claim 11, wherein the step of detecting a type of a video input signal comprises receiving a user input indicating a signal source.

14. A method in accordance with claim 11, wherein the step of determining the actual time delay comprises calculating a total delay equal to the sum of all non-variable delays for the sequence of processing steps plus all variable delays applicable to the type of the video input signal.

15. A method in accordance with claim 14, wherein the variable delays applicable to the type of the video input signal are selected from the group consisting of a Y/C separation delay, a noise reduction delay, and a deinterlacing delay.

16. A method in accordance with claim 15, wherein the Y/C separation delay equals about 1 field, the noise filtering delay equals from about 2 to 3 fields, and the deinterlacing delay equals from about 3 to 6 fields.

17. A method in accordance with claim 11, wherein the step of inserting the programmed time delay into the sequence of video processing steps comprises the steps of:
    writing pixel data to a memory controller; and
    delaying output of the pixel data to a light engine by a time value equal to the programmed time delay.

18. A method for producing synchronized audio-visual output, comprising the steps of:
    dividing a synchronized audio-visual signal into separate audio and video components;
    determining a signal type of the video component;
    determining an actual time delay caused by a sequence of video processing steps for the video component type;
    inserting into the sequence of video processing steps a programmed time delay equal to the difference between a maximum possible time delay for the sequence of video processing steps for any video component type, and the actual time delay incurred by the video component type, so as to delay an output of a video image based upon the video component; and
    manipulating an audio system to delay output of sound based upon the audio component by an amount substantially equal to the maximum possible time delay.

* * * * *

UNITED STATES PATENT AND TRADEMARK OFFICE
CERTIFICATE OF CORRECTION

| | |
|---|---|
| PATENT NO. | : 7,423,693 B2 |
| APPLICATION NO. | : 11/191550 |
| DATED | : September 9, 2008 |
| INVENTOR(S) | : James R. Cole |

It is certified that error appears in the above-identified patent and that said Letters Patent is hereby corrected as shown below:

In column 3, line 12, delete "(AID)" and insert -- (A/D) --, therefor.

Signed and Sealed this

Thirty-first Day of March, 2009

JOHN DOLL
*Acting Director of the United States Patent and Trademark Office*